US012793963B2

United States Patent
(12) United States Patent
He et al.

(10) Patent No.: US 12,793,963 B2
(45) Date of Patent: Nov. 10, 2026

(54) PREPARATION METHOD OF COMPOSITE CATHODE MATERIAL

(71) Applicant: Advanced Lithium Electrochemistry Co., Ltd., Taoyuan City (TW)

(72) Inventors: Ding-De He, Taoyuan City (TW); Han-Wei Hsieh, Taoyuan City (TW)

(73) Assignee: Advanced Lithium Electrochemistry Co., Ltd., Taoyuan City (TW)

( * ) Notice: Subject to any disclaimer, the term of this patent is extended or adjusted under 35 U.S.C. 154(b) by 736 days.

(21) Appl. No.: 18/210,470

(22) Filed: Jun. 15, 2023

(65) Prior Publication Data

US 2024/0372062 A1 Nov. 7, 2024

(30) Foreign Application Priority Data

May 5, 2023 (TW) ................................ 112116679

(51) Int. Cl.
*H01M 4/04* (2006.01)
*H01M 4/505* (2010.01)
(Continued)

(52) U.S. Cl.
CPC ......... *H01M 4/049* (2013.01); *H01M 4/0471* (2013.01); *H01M 4/505* (2013.01);
(Continued)

(58) Field of Classification Search
CPC .... H01M 4/049; H01M 4/0471; H01M 4/505; H01M 4/525; H01M 10/0562; H01M 2004/021; H01M 2004/028
See application file for complete search history.

(56) References Cited

U.S. PATENT DOCUMENTS 8,906,553 B1 * 12/2014 Hagh .................... H01M 4/525 423/594.15
8,986,889 B2 3/2015 Lee
(Continued)

FOREIGN PATENT DOCUMENTS

CN 1956242 A 5/2007
CN 102034967 A 4/2011
(Continued)

OTHER PUBLICATIONS

English machine translation of Zhou et al. CN 114388812 A (Year: 2022).*
(Continued)

*Primary Examiner* — Keith Walker
*Assistant Examiner* — Steven S Ha
(74) *Attorney, Agent, or Firm* — Kirton McConkie; Evan R. Witt

(57) ABSTRACT

A preparation method of a composite cathode material is disclosed and includes steps of: (a) providing a nickel-manganese compound material, wherein the nickel-manganese compound material is $Ni_xMn_y(OH)_2$ or $Ni_xMn_yO$, x+y=1; (b) providing a solid electrolyte material, and mixing the nickel-manganese compound material and the solid electrolyte material in a mechanical mixing into a composite material, wherein the solid electrolyte material has a weight percentage relative to the nickel-manganese compound material, and the weight percentage is ranged from 0.2 wt. % to 1.0 wt. %; and (c) providing a lithium source, mixing the lithium source and the composite material, and sintering to form the composite cathode material, wherein the composite cathode material includes a core and a coating layer, the core is made of $LiNi_{2x}Mn_{2y}O_4$ and coated by the coating layer, and the coating layer is made of the solid electrolyte material.

13 Claims, 17 Drawing Sheets

(51) Int. Cl.
*H01M 4/525* (2010.01)
*H01M 10/0562* (2010.01)
*H01M 4/02* (2006.01)

(52) U.S. Cl.
CPC ....... *H01M 4/525* (2013.01); *H01M 10/0562* (2013.01); *H01M 2004/021* (2013.01); *H01M 2004/028* (2013.01)

(56) References Cited

U.S. PATENT DOCUMENTS

| | | | |
|---|---|---|---|
| 11,063,252 | B2 | 7/2021 | Oh |
| 2008/0081257 | A1 | 4/2008 | Yoshida et al. |

FOREIGN PATENT DOCUMENTS

| | | | | | |
|---|---|---|---|---|---|
| CN | 102683709 | A | | 9/2012 | |
| CN | 108054378 | A | * | 5/2018 | ............ H01M 4/505 |
| CN | 111600014 | A | | 8/2020 | |
| CN | 111682187 | A | * | 9/2020 | ........ H01M 10/0525 |
| CN | 112635756 | A | | 4/2021 | |
| CN | 112736230 | A | | 4/2021 | |
| CN | 112736230 | B | | 3/2022 | |
| CN | 114388812 | A | * | 4/2022 | ............ H01M 4/366 |
| CN | 114678500 | A | | 6/2022 | |
| CN | 115084480 | A | | 9/2022 | |
| CN | 116014142 | A | | 4/2023 | |
| JP | 2014103098 | A | | 6/2014 | |
| JP | 2020161467 | A | | 10/2020 | |
| JP | 2021086723 | A | | 6/2021 | |
| JP | 2023-009668 | A | | 1/2023 | |
| JP | 2023500040 | A | | 1/2023 | |
| WO | 2006018921 | A1 | | 2/2006 | |
| WO | 2020049843 | A1 | | 3/2020 | |

OTHER PUBLICATIONS

English machine translation of Chen et al. CN 111682187 A (Year: 2020).*

English machine translation of Wang et al. CN 108054378 A (Year: 2018).*

Li Li et al., Stabilizing a high-voltage LiNi0.5Mn1.5O4 cathode towards all solid state batteries: a Li—Al—Ti—P—O solid electrolyte nano-shell with a host material, Nanoscale, 2019.

* cited by examiner

PREPARATION METHOD OF COMPOSITE CATHODE MATERIAL

CROSS-REFERENCE TO RELATED APPLICATION

This application claims priority to Taiwan Patent Application No. 112116679, filed on May 5, 2023. The entire contents of the above-mentioned patent application are incorporated herein by reference for all purposes.

FIELD OF THE INVENTION

The present disclosure relates to a cathode material of a secondary battery, and more particularly to a preparation method of a composite cathode material including a dry mechanical mixing manner to treat the precursor and the solid electrolyte material so that a coating layer made of solid electrolyte material is coated on the surface of the cathode material simultaneously when the cathode material is formed. The process is simple and fast, and the performance of the cathode material is improved sufficiently.

BACKGROUND OF THE INVENTION

In recent years, the requirements for electric vehicles and energy storage devices are gradually increased, and the secondary batteries used therein are also required to have good performance. In many types of the batteries, lithium manganese nickel oxide/spinel ($LiMn_{1.5}Ni_{0.5}O_4$) is a cathode material that can be charged at high voltage (5V). Due to the high potential, the lithium manganese nickel oxide material has a higher energy density compared to lithium cobalt oxide and lithium iron phosphate. LMNO-based batteries can be used in high energy and high rate applications.

However, the LMNO will be decomposed by the electrolyte under high voltage, and it is easy to lead to the problems such as the decline of capacity development, rate performance and cycle life. Therefore, the surface modification of LMNO has become an important topic. A conventional way of using LMNO in combination with the solid electrolyte is to coat the solid electrolyte on the LMNO material to improve the microstructure of the LMNO surface. Thus, an ion-conducting and conductive framework surface is formed on the surface of LMNO. The problem of poor circulation of LMNO under high pressure is alleviated sufficiently. The conductivity of LMNO is improved. However, the conventional LMNO with the solid electrolyte coated thereon needs to go through complicated processes, and the performance of LMNO may be degraded during the processes of coating the solid electrolyte.

Therefore, there is a need to provide a preparation method of a composite cathode material including a dry mechanical mixing manner to treat the precursor and the solid electrolyte material so that a coating layer made of solid electrolyte material is coated on the surface of the cathode material simultaneously when the cathode material is formed. The process is simple and fast, the performance of the cathode material is improved sufficiently, and the drawbacks encountered by the prior arts are obviated.

SUMMARY OF THE INVENTION

An object of the present disclosure is to provide a preparation method of a composite cathode material. By using the dry mechanofusion method to mix the precursor and the solid electrolyte material, the solid electrolyte material is coated on the surface of the cathode material simultaneously when the cathode material is formed. The process is simple and fast, and the performance of the cathode material is improved sufficiently. For the application of lithium nickel manganese oxide (LMNO) cathode material coated the solid electrolyte of lithium titanium aluminum phosphate ($Li_{1.3}Al_{0.3}Ti_{1.7}(PO_4)_3$, LATP), the dry mechanical mixing method is used to mix the nickel-manganese compound material, such as $Ni_{0.25}Mn_{0.75}(OH)_2$ or $Ni_{0.25}Mn_{0.75}O$ is mixed with the solid electrolyte material in advance, and then the lithium source is added to mix and sintered to form a composite cathode material with a core and a coating layer. The inner core is made of $LiNi_{0.5}Mn_{1.5}O_4$, and the outer coating layer is made of the solid electrolyte material. Since the solid electrolyte material of lithium aluminum titanium phosphate (LATP) has good ionic conductivity, when the lithium aluminum titanium phosphate (LATP) is coated on the surface of the cathode material of lithium nickel manganese oxide (LMNO) to form a composite cathode material, it facilitates to improve the rate performance and cycle performance of the cathode material of lithium nickel manganese oxide (LMNO), and the coating layer of lithium aluminum titanium phosphate (LATP) can also provide the protection to slow down the impact of the material surface being damaged by the electrolyte solution. Furthermore, in order to obtain the optimal coating effect of the solid electrolyte material, the weight percentage of the solid electrolyte material relative to nickel-manganese compound material, such as $Ni_{0.25}Mn_{0.75}(OH)_2$ or $Ni_{0.25}Mn_{0.75}O$, is controlled and ranged from 0.2 wt. % to 1.0 wt. %, preferably between 0.2 wt. % and 0.3 wt. %. That is to say, in the present disclosure, only a small amount of lithium titanium aluminum phosphate (LATP) solid electrolyte material is added to form the coating layer to improve the rate performance of the cathode material of lithium nickel manganese oxide (LMNO), and the manufacturing cost is further reduced.

Another object of the present disclosure is to provide a preparation method of a composite cathode material. Compared with direct coating of the cathode material of lithium nickel manganese oxide (LMNO) with the lithium aluminum titanium phosphate (LATP), the lithium aluminum titanium phosphate (LATP) is mixed with the pretreatment material of the nickel-manganese compound material through a mechanical mixing way such as a mechanofusion method in the present disclosure. Then, the pretreatment material with the LATP mixed is sintered to form the composite cathode material of lithium nickel manganese oxide (LMNO) with the LATP coated thereon. In this way, the generation of $Mn^{3+}$ is reduced, and the dissolution of $Mn^{3+}$ from the positive electrode material and the reduction and deposition on the negative electrode are avoided from resulting in cycle electrical decline. The working temperature of the mixing process is ranged for example between 25° C. and 45° C., and the mixing processing is performed in stages at a rotating speed ranged from 700 rpm to 3500 rpm for 5 minutes and 30 minutes. By controlling the mixing way of lithium aluminum titanium phosphate (LATP) and the pretreatment material, the working temperature, the rotating speed and the working time, it allows to avoid the structural defects of the solid electrolyte coating layer caused by high temperature and the excessive friction between particles. At the same time, it ensures that the cathode material of lithium nickel manganese oxide (LMNO) can exert low impedance and good charge and discharge performance through the coating layer of LATP solid electrolyte material.

In accordance with an aspect of the present disclosure, a preparation method of a composite cathode material is provided and includes steps of: (a) providing a nickel-manganese compound material, wherein the nickel-manganese compound material is $Ni_xMn_y(OH)_2$ or $Ni_xMn_yO$, x+y=1; (b) providing a solid electrolyte material, and mixing the nickel-manganese compound material and the solid electrolyte material in a mechanical mixing into a composite material, wherein the solid electrolyte material has a weight percentage relative to the nickel-manganese compound material, and the weight percentage is ranged from 0.2 wt. % to 1.0 wt. %; and (c) providing a lithium source, mixing the lithium source and the composite material, and sintering to form the composite cathode material, wherein the composite cathode material includes a core and a coating layer, the core is made of $LiNi_{2x}Mn_{2y}O_4$, and coated by the coating layer, and the coating layer is made of the solid electrolyte material.

In an embodiment, the nickel-manganese compound material is $Ni_{0.25}Mn_{0.75}(OH)_2$, the step (b) includes a first heat treatment process after the mechanical mixing, and the first heat treatment process has a holding temperature ranged from 300° C. to 850° C., a treating time ranged from 5 hours to 7 hours, and a temperature rising rate of 2.5° C./min.

In an embodiment, the nickel-manganese compound material is $Ni_{0.25}Mn_{0.75}O$, the step (a) includes a pre-oxidation process, and the pre-oxidation process has a holding temperature ranged from 300° C. to 850° C., a treating time ranged from 5 hours to 7 hours, and a temperature rising rate of 2.5° C./min.

In an embodiment, the step (b) includes a first heat treatment process after the mechanical mixing, and the first heat treatment process has a holding temperature ranged from 300° C. to 750° C., a treating time ranged from 5 hours to 7 hours, and a temperature rising rate of 2.5° C./min.

In an embodiment, the nickel-manganese compound material and the solid electrolyte material are mixed at a rotating speed of 700 rpm for 5 minutes, mixed at a rotating speed of 1400 rpm for 5 minutes, mixed at a rotating speed of 2100 rpm for 5 minutes, mixed at a rotating speed of 2800 rpm for 10 minutes and mixed at a rotating speed of 3500 rpm for 10 minutes in the mechanical mixing of the step (b).

In an embodiment, the nickel-manganese compound material and the solid electrolyte material are mixed at a working temperature ranged from 25° C. to 45° C. in the mechanical mixing of the step (b).

In an embodiment, the solid electrolyte material has a chemical formula of $Li_{1+z}Al_zTi_{2-z}(PO_4)_3$, z≤2.

In an embodiment, the mechanical mixing includes a mechanofusion method.

In an embodiment, the lithium source and the composite material are mixed at a rotating speed of 700 rpm for 5 minutes, and mixed at a rotating speed of 1400 rpm for 30 minutes in a mechanical manner of the step (c).

In an embodiment, the step (c) includes a second heat treatment process, and the second heat treatment process has a holding temperature ranged from 300° C. to 710° C., a treating time ranged from 24 hours to 30 hours, and a temperature rising rate of 2.5° C./min.

In an embodiment, the nickel-manganese compound material has a molar ratio of 1:1.02 relative to the lithium source in the composite material in the step (c).

In an embodiment, the weight percentage of the solid electrolyte material relative to the nickel-manganese compound material is ranged from 0.2 wt. % to 0.3 wt. %.

In an embodiment, the nickel-manganese compound material has an average particle size ranged from 10 microns to 20 microns, and the solid electrolyte material has an average particle size ranged from 1 micron and 5 microns.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

Figure 1:
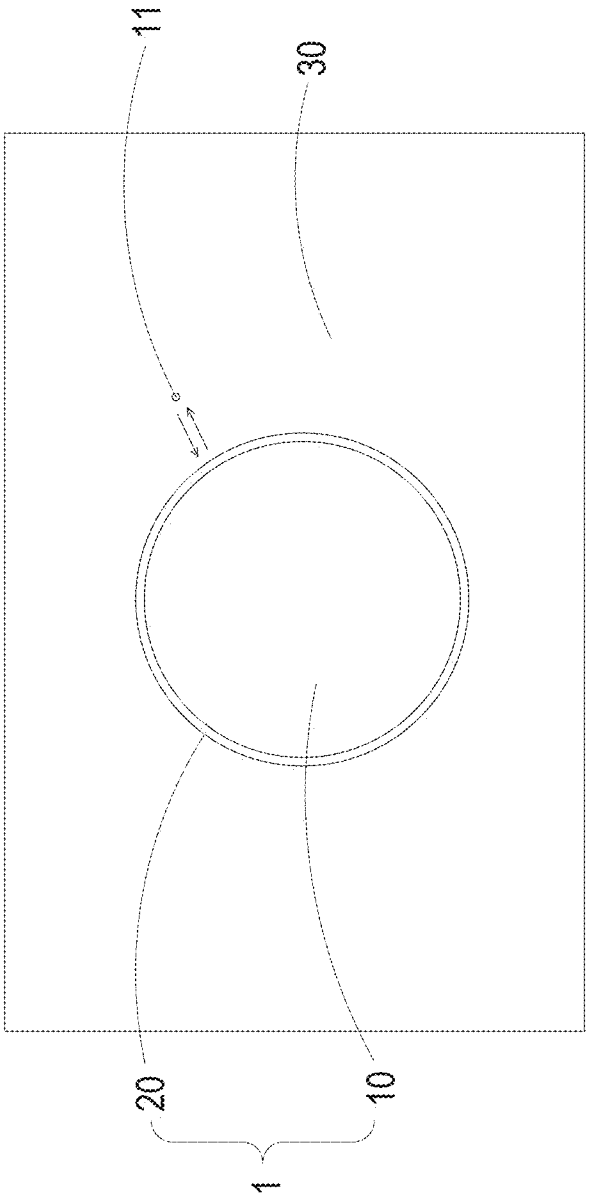
FIG. 1 is a schematic structural view illustrating a composite cathode material according to an embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, although the "first," "second," "third," and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments. Besides, "and/or" and the like may be used herein for including any or all combinations of one or more of the associated listed items. Alternatively, the word "about" means within an acceptable standard error of ordinary skill in the art-recognized average. In addition to the operation/working examples, or unless otherwise specifically stated otherwise, in all cases, all of the numerical ranges, amounts, values and percentages, such as the number for the herein disclosed materials, time duration, temperature, operating conditions, the ratio of the amount, and the like, should be understood as the word "about" decorator. Accordingly, unless otherwise indicated, the numerical parameters of the present invention and scope of the appended patent proposed is to follow changes in the desired approximations. At least, the number of significant digits for each numerical parameter should at least be reported and explained by conventional rounding technique is applied. Herein, it can be expressed as a range between from one endpoint to the other or both endpoints. Unless otherwise specified, all ranges disclosed herein are inclusive.

Figure 2A:
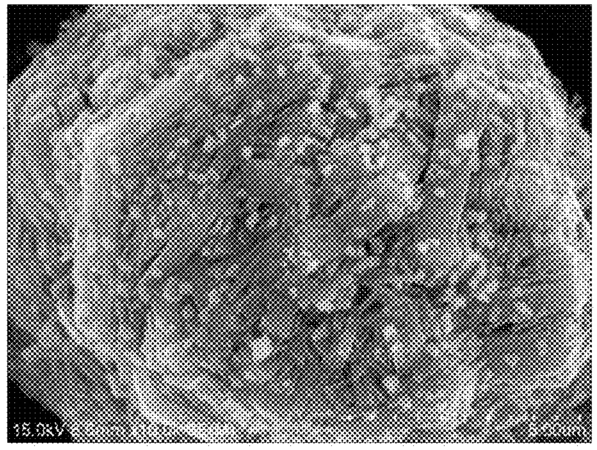
FIG. 2A is a SEM image showing the nickel-manganese compound material of $Ni_{0.25}Mn_{0.75}(OH)_2$ of the present disclosure.
Figure 2B:
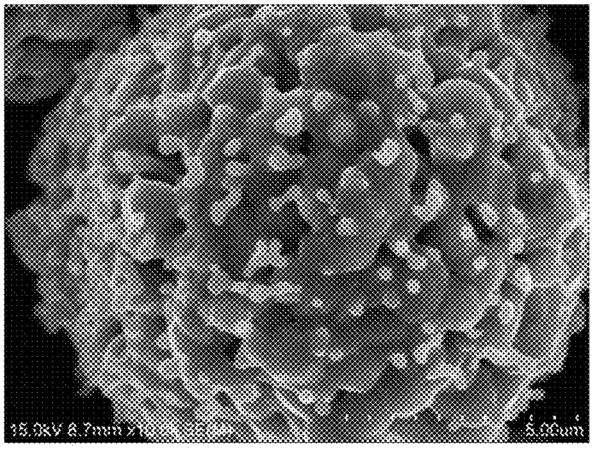
FIG. 2B is a SEM image showing the nickel-manganese compound material of $Ni_{0.25}Mn_{0.75}O$ of the present disclosure.
Figure 2C:
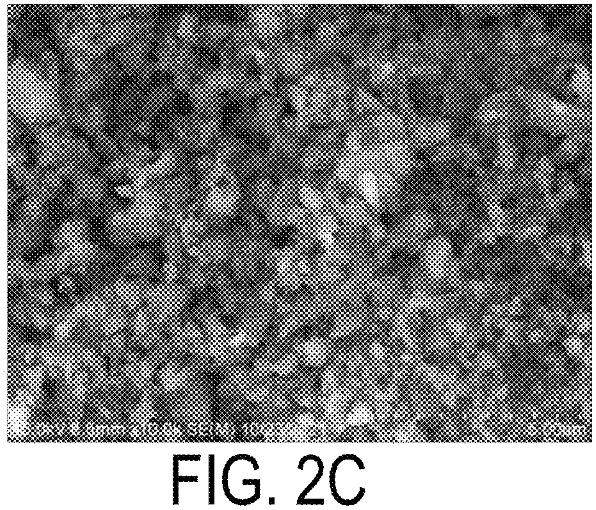
FIG. 2C is a SEM image showing the lithium aluminum titanium phosphate (LATP) of the present disclosure.

FIG. 1 is a schematic structural view illustrating a composite cathode material according to an embodiment of the present disclosure. In the embodiment, the composite cathode material 1 includes a core 10 and a coating layer 20. The core 10 is made of the cathode material of lithium nickel manganese oxide (LNMO). Preferably but not exclusively, the lithium nickel manganese oxide (LNMO) is $LiNi_{0.5}Mn_{1.5}O_4$. In the embodiment, the coating layer 20 is made of the solid electrolyte material of lithium aluminum titanium phosphate (LATP). Preferably but not exclusively, the lithium aluminum titanium phosphate (LATP) is $Li_{1.3}Al_{0.3}Ti_{1.7}(PO_4)_3$. In the embodiment, the lithium nickel manganese oxide (LMNO) cathode material is a high-voltage cathode material that does not contain cobalt elements, and has a high redox potential and a high energy density. Preferably but not exclusively, the composite cathode material 1 is used in the liquid electrolyte 30, and $Li^+$ ions 11 are allowed in the intercalation/deintercalation with the lithium nickel manganese oxide (LMNO) cathode material in the inner core 10 through the coating layer 20 of the solid electrolyte. Notably, in the preparation method of the present disclosure, the lithium titanium aluminum phosphate (LATP) is mixed with the pretreatment material through a mechanical mixing way such as a mechanofusion method. Thereafter, the pretreatment material with the LATP mixed is sintered to form the composite cathode material of lithium nickel manganese oxide (LMNO) with the LATP coated thereon. Preferably but not exclusively, the pretreatment material is the nickel-manganese compound material, such as the $Ni_{0.25}Mn_{0.75}(OH)_2$ or $Ni_{0.25}Mn_{0.75}O$. The lithium nickel manganese oxide (LMNO) cathode material is not directly used for coating process. FIG. 2A is a SEM image showing the nickel-manganese compound material of $Ni_{0.25}Mn_{0.75}(OH)_2$ of the present disclosure. FIG. 2B is a SEM image showing the nickel-manganese compound material of $Ni_{0.25}Mn_{0.75}O$ of the present disclosure. FIG. 2C is a SEM image showing the lithium aluminum titanium phosphate (LATP) of the present disclosure. Certainly, the types, the composition ratio and the material properties of the core 10 and the coating layer 20 for the composite cathode material 1 are adjustable according to the practical requirements, and are not limited thereto. In the following descriptions, the dry mechanofusion method is used to pretreat the precursor and the solid electrolyte material in the preparation method of the composite cathode material 1 of the present disclosure.

Figure 3:
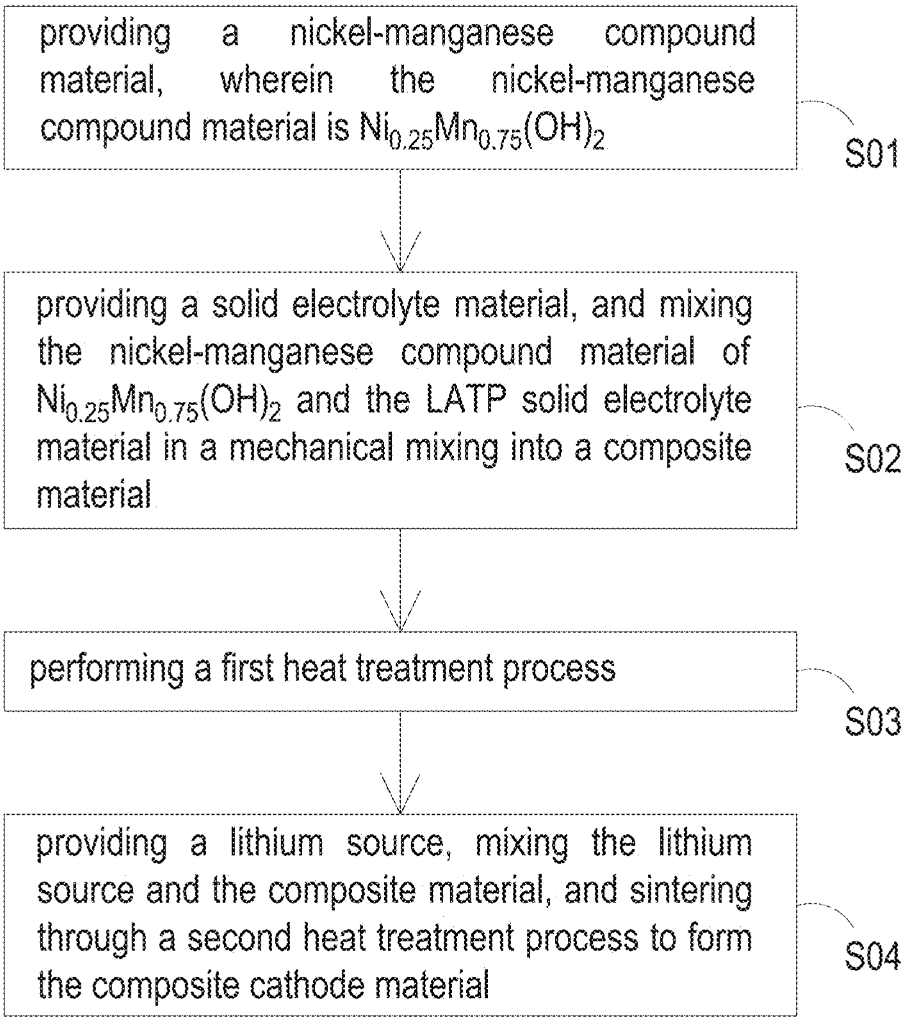
FIG. 3 is a flow chart illustrating a preparation method of the composite cathode material according to a first embodiment of the present disclosure.
Figure 4A:
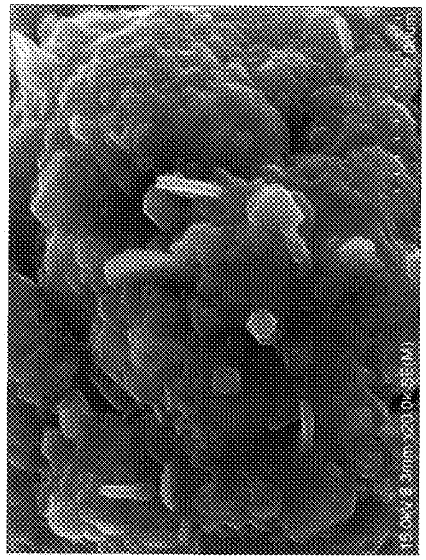
FIGS. 4A to 4D are SEM images showing the cathode electrode material of the first comparative example.
Figure 4B:
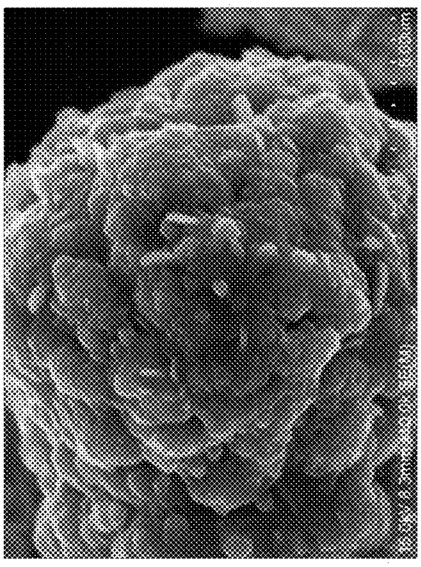
Figure 4C:
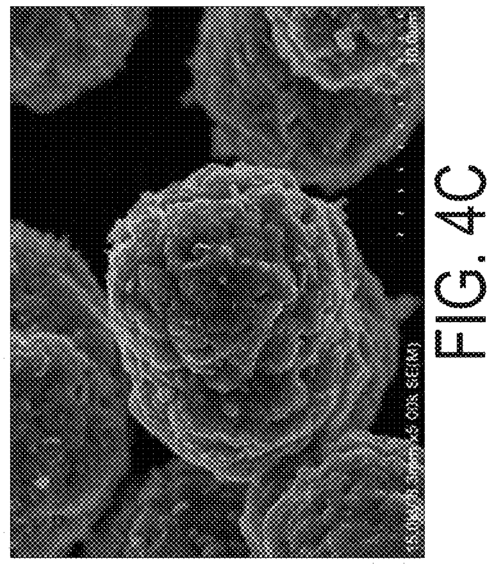
Figure 4D:
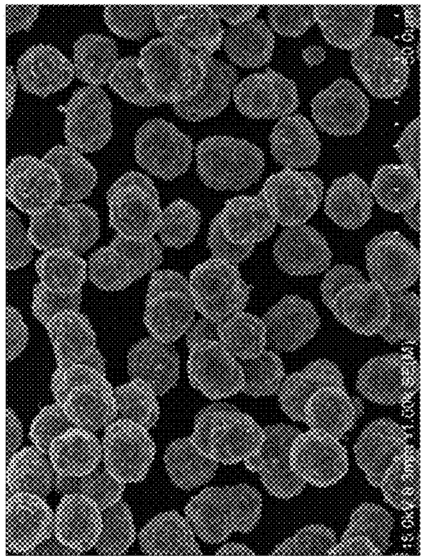
Figure 5A:
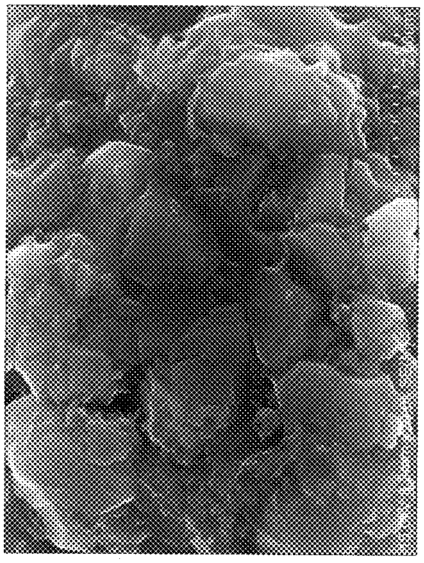
FIGS. 5A to 5D are SEM images showing the composite cathode material of the first example of the present disclosure.
Figure 5B:
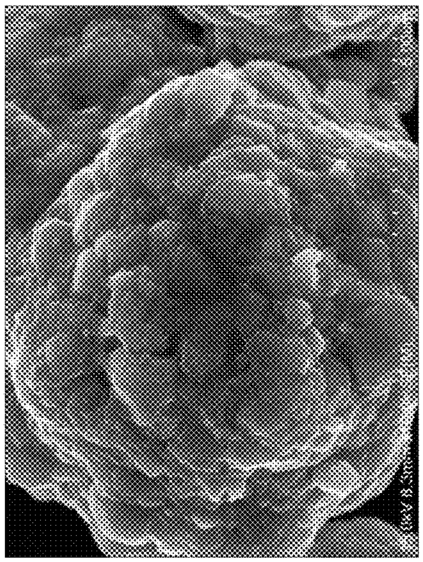
Figure 5C:
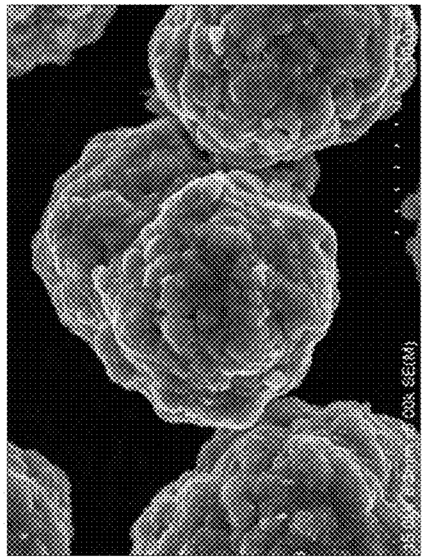
Figure 5D:
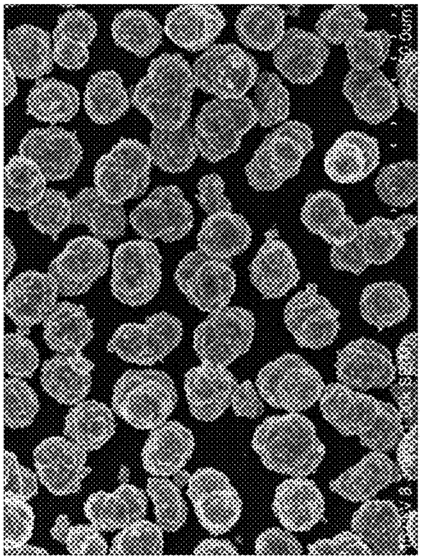
Figure 6A:
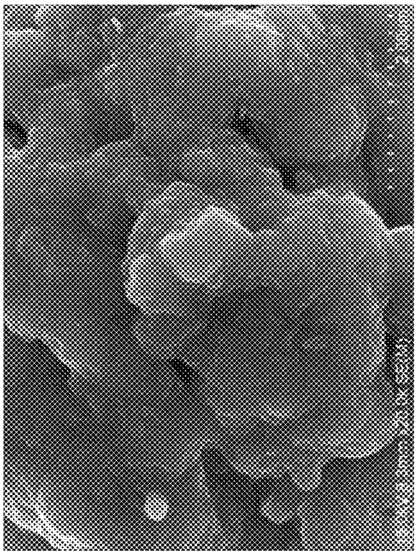
FIGS. 6A to 6D are SEM images showing the composite cathode material of the second example of this present disclosure.
Figure 6B:
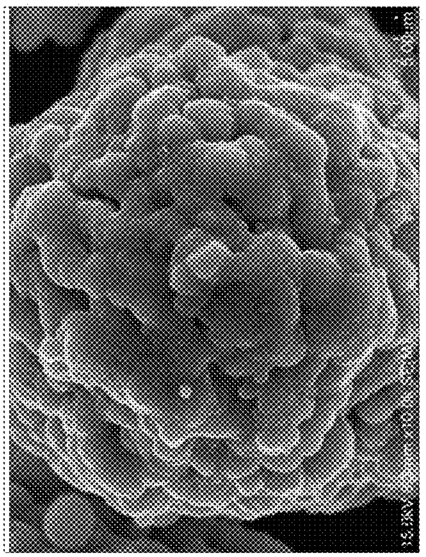
Figure 6C:
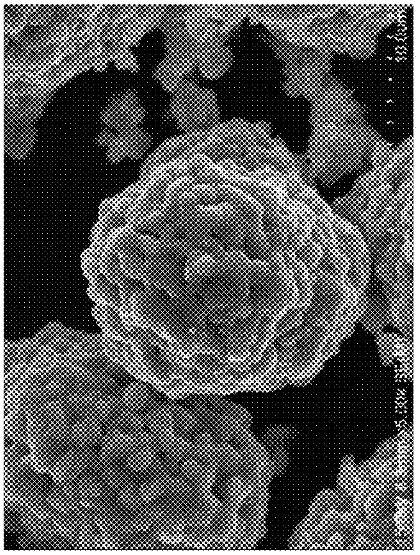
Figure 6D:
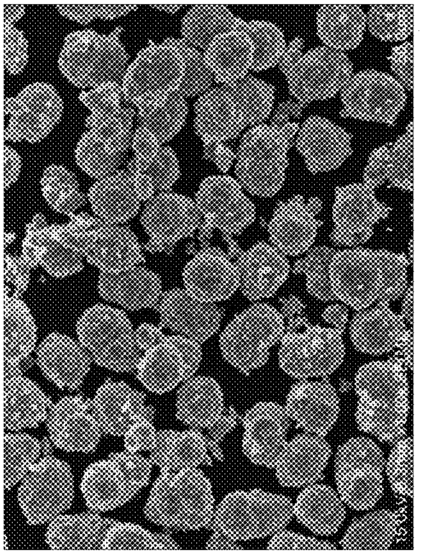
Figure 7A:
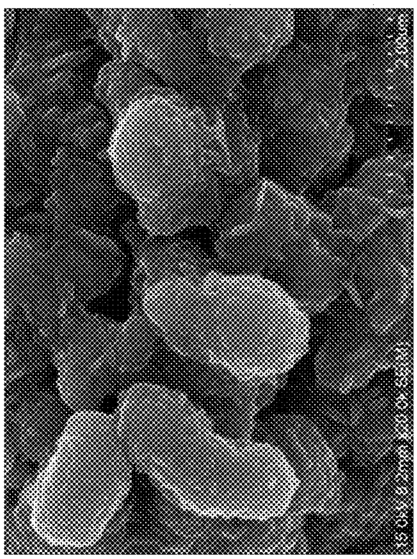
FIGS. 7A to 7D are SEM images showing the composite cathode material of the third example of this present disclosure.
Figure 7B:
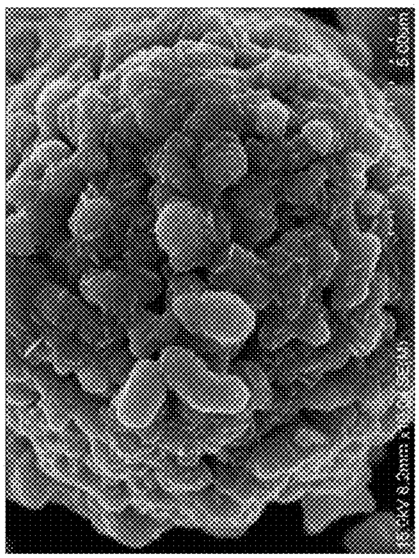
Figure 7C:
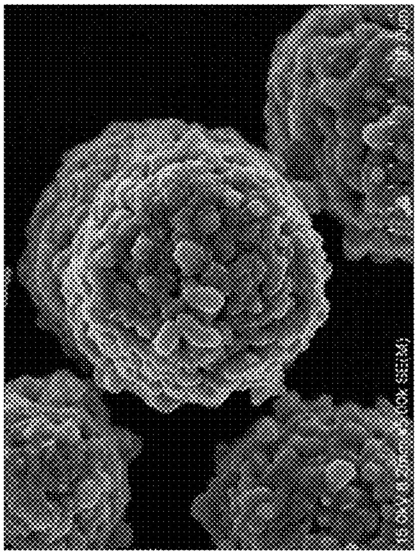
Figure 7D:
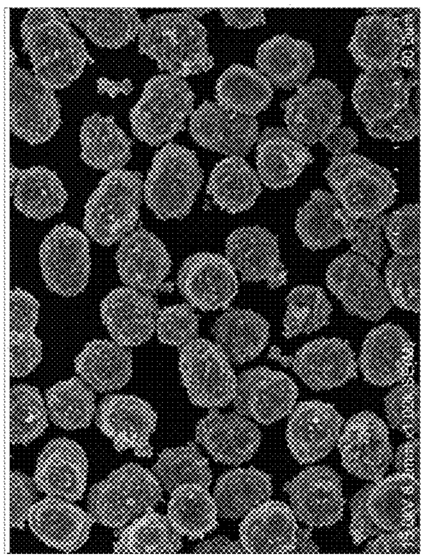

FIG. 3 is a flow chart illustrating a preparation method of the composite cathode material according to a first embodiment of the present disclosure. In the embodiment, a nickel-manganese compound material is provided, as shown in the step S01. Preferably but not exclusively, the nickel-manganese compound material is $Ni_{0.25}Mn_{0.75}(OH)_2$. In the embodiment, the nickel-manganese compound material of $Ni_{0.25}Mn_{0.75}(OH)_2$ has an average particle size ranged from 10 microns to 20 microns. Preferably but not exclusively, the average particle size of the nickel-manganese compound material is 12.90 microns with the surface area of 0.6 $m^2/g$. In addition, a solid electrolyte material of lithium titanium aluminum phosphate (LATP) is provided. The solid electrolyte material has an average particle size ranged from 1 micron to 5 microns. Preferably but not exclusively, the average particle size of the solid electrolyte material is 1.79 microns. In the embodiment, the nickel-manganese compound material of $Ni_{0.25}Mn_{0.75}(OH)_2$ and the LATP solid electrolyte material are mixed in a mechanical mixing to form a composite material, as shown in the step S02. In the embodiment, the LATP solid electrolyte material has a weight percentage relative to the nickel-manganese compound material of $Ni_{0.25}Mn_{0.75}(OH)_2$, and the weight percentage is ranged from 0.2 wt. % to 1.0 wt. %. The mechanical mixing refers to the dry mechanofusion method. In the step S02, the nickel-manganese compound material and the solid electrolyte material are mixed at a rotating speed of 700 rpm for 5 minutes, mixed at a rotating speed of 1400 rpm for 5 minutes, mixed at a rotating speed of 2100 rpm for 5 minutes, mixed at a rotating speed of 2800 rpm for 10 minutes and mixed at a rotating speed of 3500 rpm for 10 minutes in the mechanical mixing. Preferably but not exclusively, the nickel-manganese compound material and the solid electrolyte material are mixed at a working temperature ranged from 25° C. to 45° C. in the mechanical mixing.

After the forgoing mechanical mixing is completed, a first heat treatment process is performed, as shown in the step S03. Preferably but not exclusively, the first heat treatment process has a holding temperature ranged from 300° C. to 850° C., a treating time ranged from 5 hours to 7 hours, and a temperature rising rate of 2.5° C./min.

Thereafter, in the step S04, a lithium source such as the lithium hydroxide is provided, and the lithium source and the foregoing composite material are mixed and sintered to form the composite cathode material 1. Preferably but not exclusively, the nickel-manganese compound material of $Ni_{0.25}Mn_{0.75}(OH)_2$ has a molar ratio of 1:1.02 relative to the lithium source in the composite material. In the step S04, the lithium source and the composite material are sintered in a second heat treatment process. Preferably but not exclusively, the second heat treatment process has a holding temperature ranged from 300° C. to 710° C., a treating time ranged from 24 hours to 30 hours, and a temperature rising rate of 2.5° C./min. In the embodiment, the obtained composite cathode material 1, as shown in FIG. 1, includes a core 10 and a coating layer 20. Preferably but not exclusively, the core 10 is made of $LiNi_{0.5}Mn_{1.5}O_4$, and coated by the coating layer 20, and the coating layer 20 is made of the LATP solid electrolyte material.

Notably, in the embodiment, the weight percentage of LATP solid electrolyte material relative to the nickel-manganese compound material of $Ni_{0.25}Mn_{0.75}(OH)_2$ is further controlled and ranged from 0.2 wt. % to 1.0 wt. %, so as to obtain an optimized coating effect of the solid electrolyte material.

FIGS. 4A to 4D are SEM images showing the cathode electrode material of the first comparative example. In the first comparative example, the lithium nickel manganese oxide (LMNO) cathode material of $LiNi_{0.5}Mn_{1.5}O_4$) is not coated with the LATP solid electrolyte material.

FIGS. 5A to 5D are SEM images showing the composite cathode material of the first example of the present disclosure. In the first example, the weight percentage of LATP solid electrolyte material relative to the nickel-manganese compound material of $Ni_{0.25}Mn_{0.75}(OH)_2$ is 0.2 wt. %, and the composite cathode material is obtained through the forgoing steps S01~S04.

FIGS. 6A to 6D are SEM images showing the composite cathode material of the second example of this present disclosure. In the second example, the weight percentage of LATP solid electrolyte material relative to the nickel-manganese compound material of $Ni_{0.25}Mn_{0.75}(OH)_2$ is 0.5 wt. %, and the composite cathode material is obtained through the forgoing steps S01~S04.

FIGS. 7A to 7D are SEM images showing the composite cathode material of the third example of this present disclosure. In the third example, the weight percentage of LATP solid electrolyte material relative to the nickel-manganese compound material of $Ni_{0.25}Mn_{0.75}(OH)_2$ is 1.0 wt. %, and the composite cathode material is obtained through the forgoing steps S01~S04.

Figure 8:
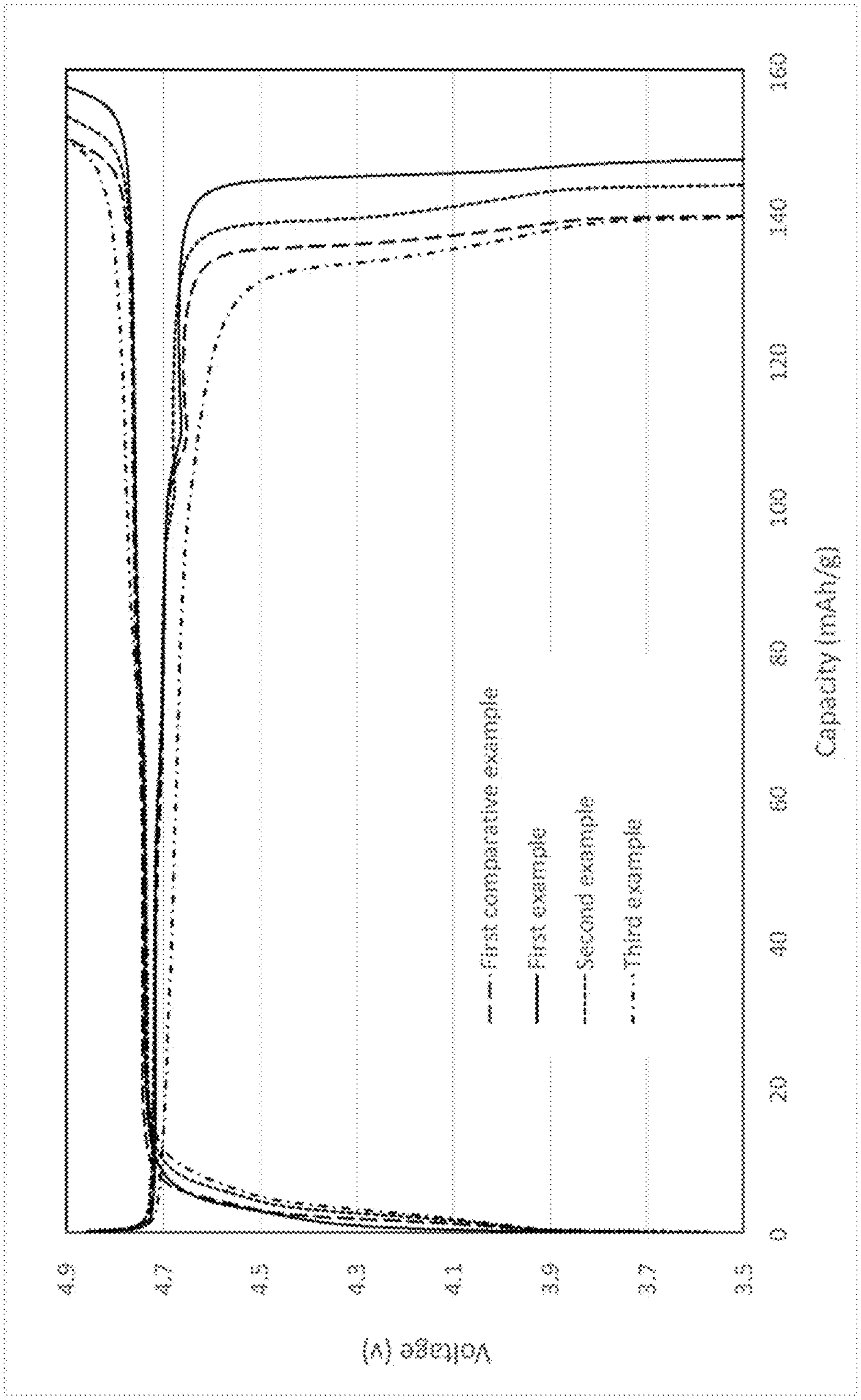
FIG. 8 shows the voltage vs. the charge and discharge capacity curves of the first comparative example, the first example, the second example and the third example of the present disclosure.

FIG. 8 shows the voltage vs. the charge and discharge capacity curves of the first comparative example, the first example, the second example and the third example of the present disclosure. The button batteries made of the first comparative example, the first example, the second example and the third example of the present disclosure are tested at a charge-discharge rate (C-rate) of 0.1C to obtain the results. The positive electrode sheet of the button battery is made of the cathode material, the conductive agent and the binder in a ratio of 94:4:2, and the negative electrode sheet is made of lithium metal. The electrolyte solution of the button battery includes 1.15 M lithium hexafluorophosphate ($LiPF_6$), ethylene carbonate (EC), diethyl carbonate (DEC), ethyl methyl carbonate (EMC) and 5 wt. % fluoroethylene carbonate (FEC). The 0.1C first-cycle and the second-cycle charge and discharge capacity results are listed in Table 1. In addition, Table 1 also lists the rate performance results of the first comparative example, the first example, the second example and the third example of the present disclosure charged at 0.2 and then discharged at 1C/2C/3C/5C. As shown in FIG. 8 and Table 1, the capacities and the rate performance of the first example, the second example and the third example of the present disclosure are all better than those of the first comparative example. It can be seen that the dry mechanical mixing method is used in the present disclosure to mix the nickel-manganese compound material of $Ni_{0.25}Mn_{0.75}(OH)_2$ and the LATP solid electrolyte material in advance. Then, the lithium source is added to mix and sinter with the forgoing composite material to form the composite cathode material with a core and a coating layer. In that, the capacity and the rate performance of the lithium nickel manganese oxide (LMNO) cathode material is improved.

TABLE 1

| Samples | 0.1 C 1st-cycle charge/discharge capacity (mAh/g) | 0.1 C 2nd-cycle charge/discharge capacity (mAh/g) | 1 C/2 C/3 C/5 C Discharge capacity (mAh/g) | Coulomb efficiency C.E. % |
|---|---|---|---|---|
| First comparative example | 150/140 | 146/140 | 133/121/110/89 | 93.3 |
| First example | 161/146 | 156/146 | 143/135/127/110 | 90.7 |
| Second example | 159/142 | 150/144 | 140/132/124/105 | 89.3 |
| Third example | 154/139 | 148/140 | 135/126/117/99 | 90.3 |

Figure 9:
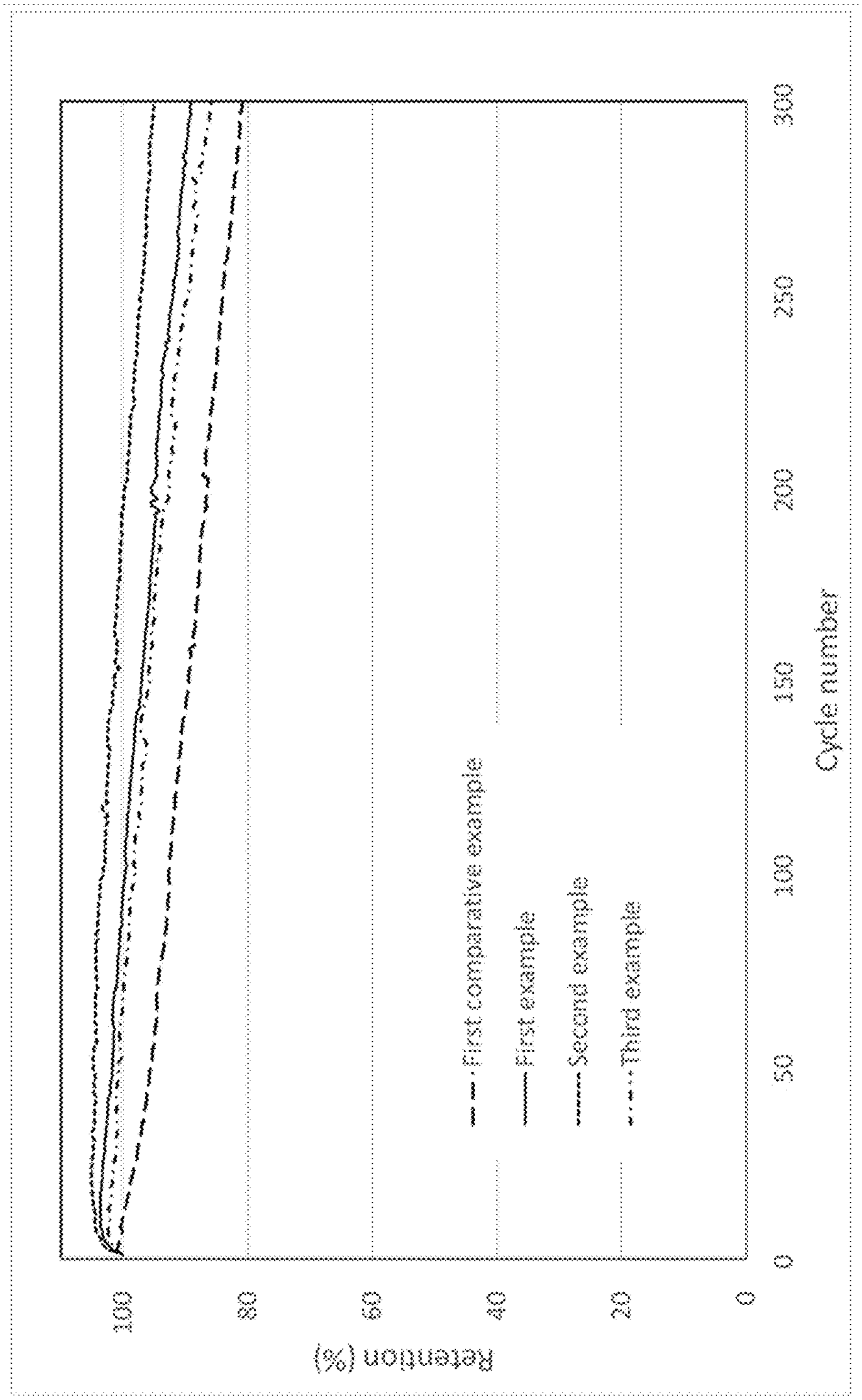
FIG. 9 shows the retention vs. the cycle number curves of the first comparative example, the first example, the second example and the third example of the present disclosure.

FIG. 9 shows the retention vs. the cycle number curves of the first comparative example, the first example, the second example and the third example of the present disclosure. The button batteries made of the first comparative example, the first example, the second example and the third example of the present disclosure are tested at a charge-discharge rate (C-rate) of 1C to obtain the results. As shown in FIG. 9, the capacity retention rates of the first example, the second example and the third example of the present disclosure are all better than those of the first comparative example. It can be seen that the composite positive electrode material formed by the preparation method of the present disclosure has the advantages of improving the cycle performance and the cycle life of lithium nickel manganese oxide (LMNO) cathode material.

Figure 10:
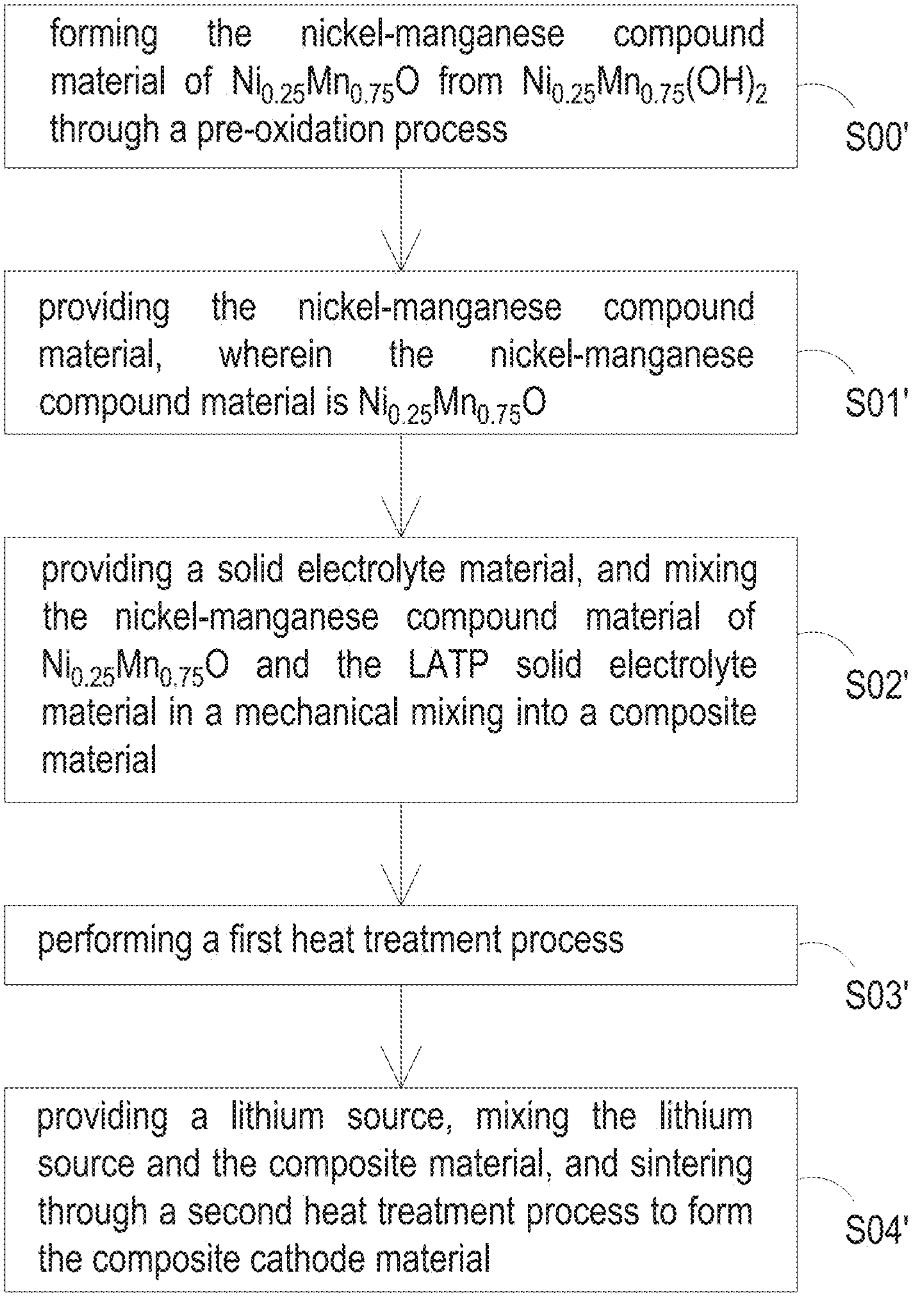
FIG. 10 is a flow chart illustrating a preparation method of the composite cathode material according to a second embodiment of the present disclosure.
Figure 11A:
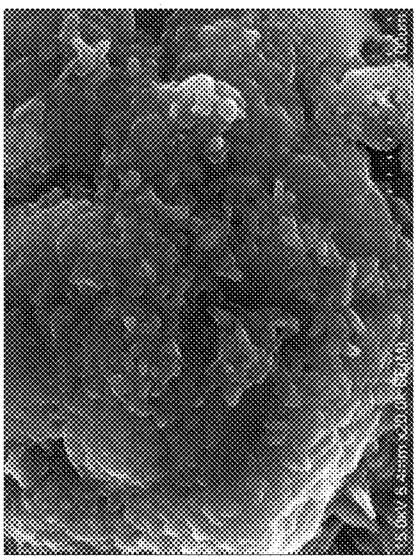
FIGS. 11A to 11D are SEM images showing the composite cathode material of the fourth example of this present disclosure.
Figure 11B:
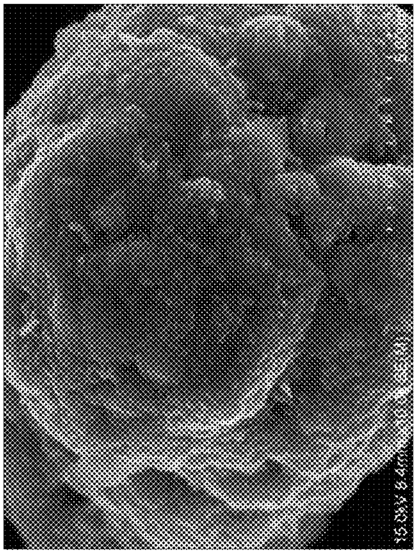
Figure 11C:
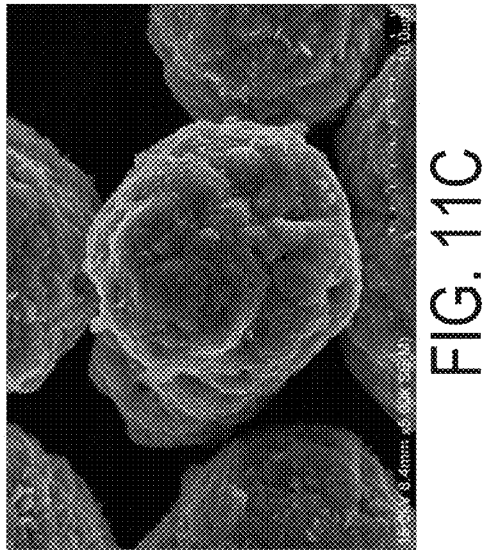
Figure 11D:
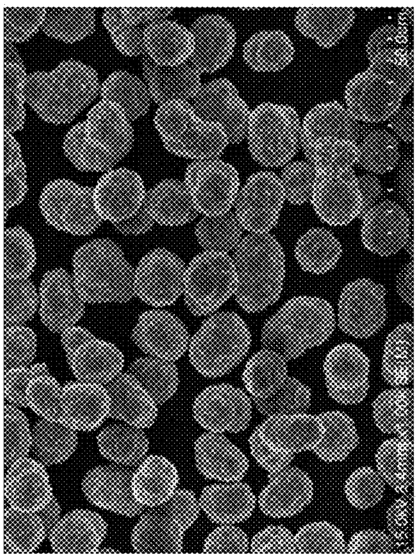
Figure 12A:
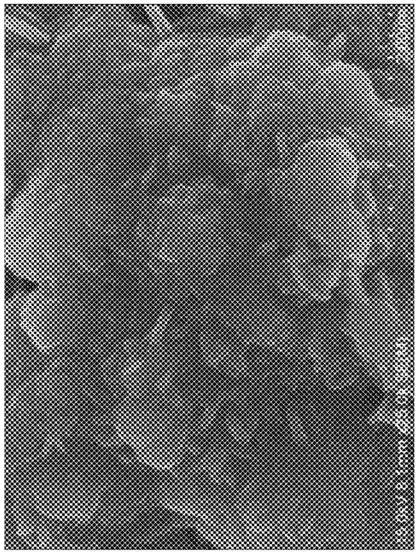
FIGS. 12A to 12D are SEM images showing the composite cathode material of the fifth example of this present disclosure.
Figure 12B:
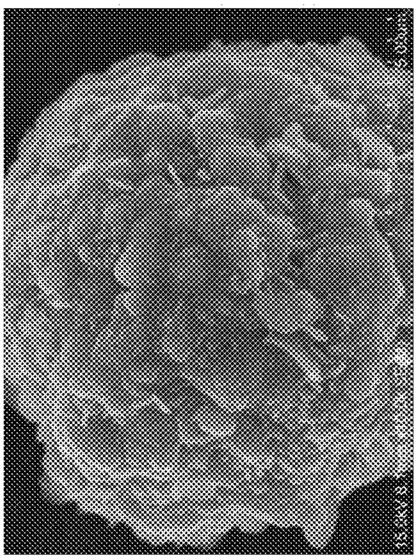
Figure 12C:
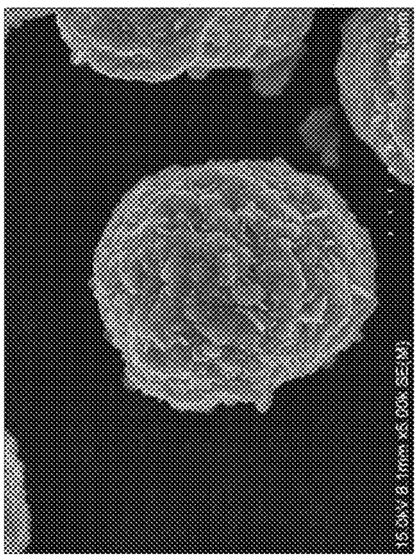
Figure 12D:
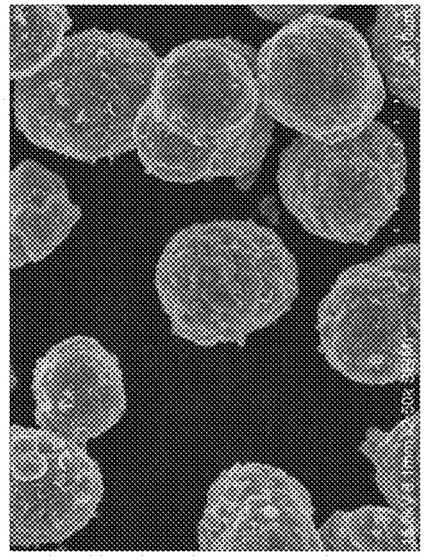
Figure 13A:
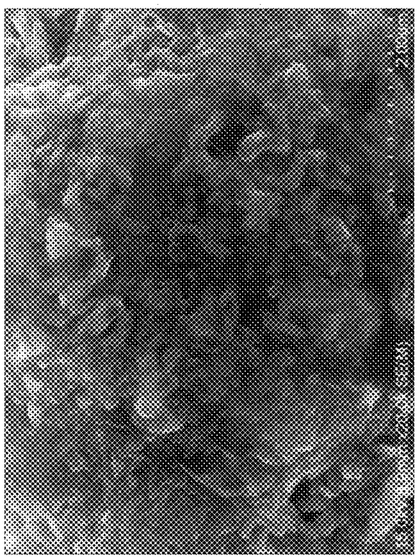
FIGS. 13A to 13D are SEM images showing the composite cathode material of the sixth example of this present disclosure.
Figure 13B:
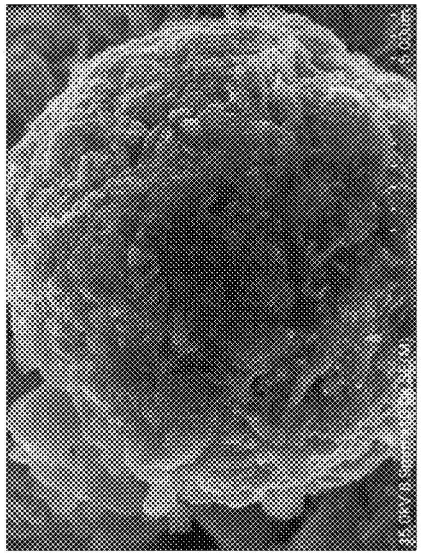
Figure 13C:
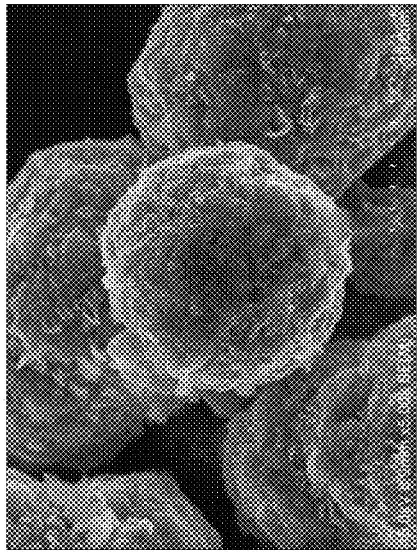
Figure 13D:
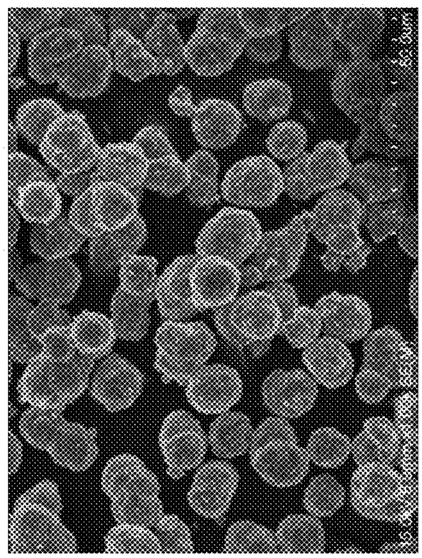

FIG. 10 is a flow chart illustrating a preparation method of the composite cathode material according to a second embodiment of the present disclosure. In the embodiment, a nickel-manganese compound material is provided, as shown in the step S01'. Preferably but not exclusively, the nickel-manganese compound material is $Ni_{0.25}Mn_{0.75}O$. In the embodiment, the nickel-manganese compound material of $Ni_{0.25}Mn_{0.75}O$ is made from $Ni_{0.25}Mn_{0.75}(OH)_2$ through a pre-oxidation process. As shown in the step S00', $Ni_{0.25}Mn_{0.75}(OH)_2$ is treated through a pre-oxidation process to obtain the nickel-manganese compound material of $Ni_{0.25}Mn_{0.75}O$. In the embodiment, the nickel-manganese compound material of $Ni_{0.25}Mn_{0.75}O$ has an average particle size ranged from 10 microns to 20 microns. Preferably but not exclusively, the average particle size of the nickel-manganese compound material is 13.96 microns with the surface area of 20.49 $m^2/g$. Preferably but not exclusively, the pre-oxidation process has a holding temperature ranged from 300° C. to 850° C., a treating time ranged from 5 hours to 7 hours, and a temperature rising rate of 2.5° C./min. Certainly, in other embodiments, the nickel-manganese compound material of $Ni_{0.25}Mn_{0.75}O$ can be obtained by other processing procedures, and the present disclosure is not limited thereto. Thereafter, as shown in the step S02', a solid electrolyte material of lithium titanium aluminum phosphate (LATP) is provided, the nickel-manganese compound material of $Ni_{0.25}Mn_{0.75}O$ and the LATP solid electrolyte material are mixed in a dry mechanofusion method to form a composite material. In the embodiment, the LATP solid electrolyte material has a weight percentage relative to the nickel-manganese compound material of $Ni_{0.25}Mn_{0.75}O$, and the weight percentage is ranged from 0.2 wt. % to 1.0 wt. %. Preferably but not exclusively, in the step S02', the nickel-manganese compound material and the solid electrolyte material are mixed at a rotating speed of 700 rpm for 5 minutes, mixed at a rotating speed of 1400 rpm for 5 minutes, mixed at a rotating speed of 2100 rpm for 5 minutes, mixed at a rotating speed of 2800 rpm for 10 minutes and mixed at a rotating speed of 3500 rpm for 10 minutes in the mechanical mixing. Furthermore, the nickel-manganese compound material and the solid electrolyte material are mixed at a working temperature ranged from 25° C. to 45° C. in the mechanical mixing. After the forgoing mechanical mixing is completed, a first heat treatment process is performed, as shown in the step S03'. Preferably but not exclusively, the first heat treatment process has a holding temperature ranged from 300° C. to 750° C., a treating time ranged from 5 hours to 7 hours, and a temperature rising rate of 2.5° C./min.

Thereafter, in the step S04', a lithium source such as the lithium hydroxide is provided, and the lithium source and the foregoing composite material are mixed and sintered to form the composite cathode material. Preferably but not exclusively, the forgoing nickel-manganese compound material of $Ni_{0.25}Mn_{0.75}O$ has a molar ratio of 1:1.02 relative to the lithium source in the composite material. In the step S04', the lithium source and the composite material are sintered in a second heat treatment process. Preferably but not exclusively, the second heat treatment process has a holding temperature ranged from 300° C. to 710° C., a treating time ranged from 24 hours to 30 hours, and a temperature rising rate of 2.5° C./min. In the embodiment, the obtained composite cathode material 1, as shown in FIG. 1, includes a core 10 and a coating layer 20. Preferably but not exclusively, the core 10 is made of $LiNi_{0.5}Mn_{1.5}O_4$, and coated by the coating layer 20, and the coating layer 20 is made of the LATP solid electrolyte material.

Notably, in the embodiment, the weight percentage of LATP solid electrolyte material relative to the nickel-manganese compound material of $Ni_{0.25}Mn_{0.75}O$ is further controlled and ranged from 0.2 wt. % to 1.0 wt. %. so as to obtain an optimized coating effect of the solid electrolyte material.

FIGS. 11A to 11D are SEM images showing the composite cathode material of the fourth example of this present disclosure. In the fourth example, the weight percentage of LATP solid electrolyte material relative to the nickel-manganese compound material of $Ni_{0.25}Mn_{0.75}O$ is 0.2 wt. %, and the composite cathode material is obtained through the forgoing steps S01'~S04'.

FIGS. 12A to 12D are SEM images showing the composite cathode material of the fifth example of this present disclosure. In the fifth example, the weight percentage of LATP solid electrolyte material relative to the nickel-manganese compound material of $Ni_{0.25}Mn_{0.75}O$ is 0.3 wt. %, and the composite cathode material is obtained through the forgoing steps S01'~S04'.

FIGS. 13A to 13D are SEM images showing the composite cathode material of the sixth example of this present disclosure. In the sixth example, the weight percentage of LATP solid electrolyte material relative to the nickel-manganese compound material of $Ni_{0.25}Mn_{0.75}O$ is 0.5 wt. %, and the composite cathode material is obtained through the forgoing steps S01'~S04'.

Figure 14:
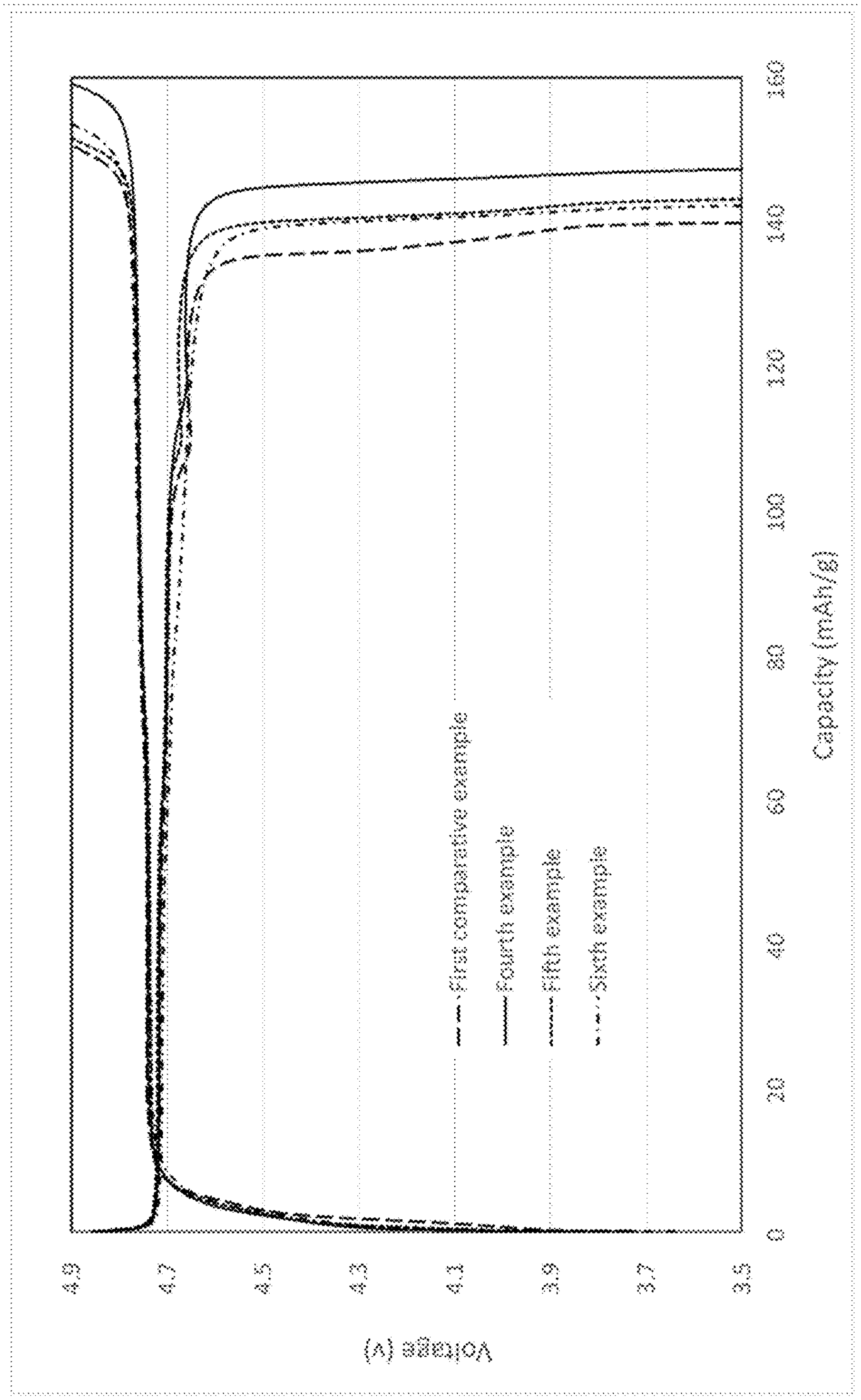
FIG. 14 shows the voltage vs. the charge and discharge capacity curves of the first comparative example, the fourth example, the fifth example and the sixth example of the present disclosure.

FIG. 14 shows the voltage vs. the charge and discharge capacity curves of the first comparative example, the fourth example, the fifth example and the sixth example of the present disclosure. The button batteries made of the first comparative example, the fourth example, the fifth example and the sixth example of the present disclosure are tested at a charge-discharge rate (C-rate) of 0.1C to obtain the results. The positive electrode sheet of the button battery is made of the cathode material, the conductive agent and the binder in a ratio of 94:4:2, and the negative electrode sheet is made of lithium metal. The electrolyte solution of the button battery includes 1.15 M lithium hexafluorophosphate ($LiPF_6$), ethylene carbonate (EC), diethyl carbonate (DEC), ethyl methyl carbonate (EMC) and 5 wt. % fluoroethylene carbonate (FEC). The 0.1C first-cycle and the second-cycle charge and discharge capacity results are listed in Table 2. In addition, Table 2 also lists the rate performance results of the first comparative example, the fourth example, the fifth example and the sixth example of the present disclosure charged at 0.2 and then discharged at 1C/2C/3C/5C. As shown in FIG. 14 and Table 2, the capacities and the rate performance of the fourth example, the fifth example and the sixth example of the present disclosure are all better than those of the first comparative example. It can be seen that the dry mechanical mixing method is used in the present disclosure to mix the nickel-manganese compound material of $Ni_{0.25}Mn_{0.75}O$ and the LATP solid electrolyte material in advance. Then, the lithium source is added to mix and sinter with the forgoing composite material to form the composite cathode material with a core and a coating layer. In that, the capacity and the rate performance of the lithium nickel manganese oxide (LMNO) cathode material is improved.

TABLE 2

| Samples | 0.1 C 1st-cycle charge/discharge capacity (mAh/g) | 0.1 C 2nd-cycle charge/discharge capacity (mAh/g) | 1 C/2 C/3 C/5 C Discharge capacity (mAh/g) | Coulomb efficiency C.E. % |
|---|---|---|---|---|
| First comparative example | 150/140 | 146/140 | 133/121/110/89 | 93.3 |
| Fourth example | 163/146 | 156/146 | 140/129/119/97 | 89.6 |
| Fifth example | 160/141 | 150/142 | 136/127/118/99 | 88.1 |
| Sixth example | 160/140 | 152/141 | 136/128/120/103 | 87.5 |

Figure 15:
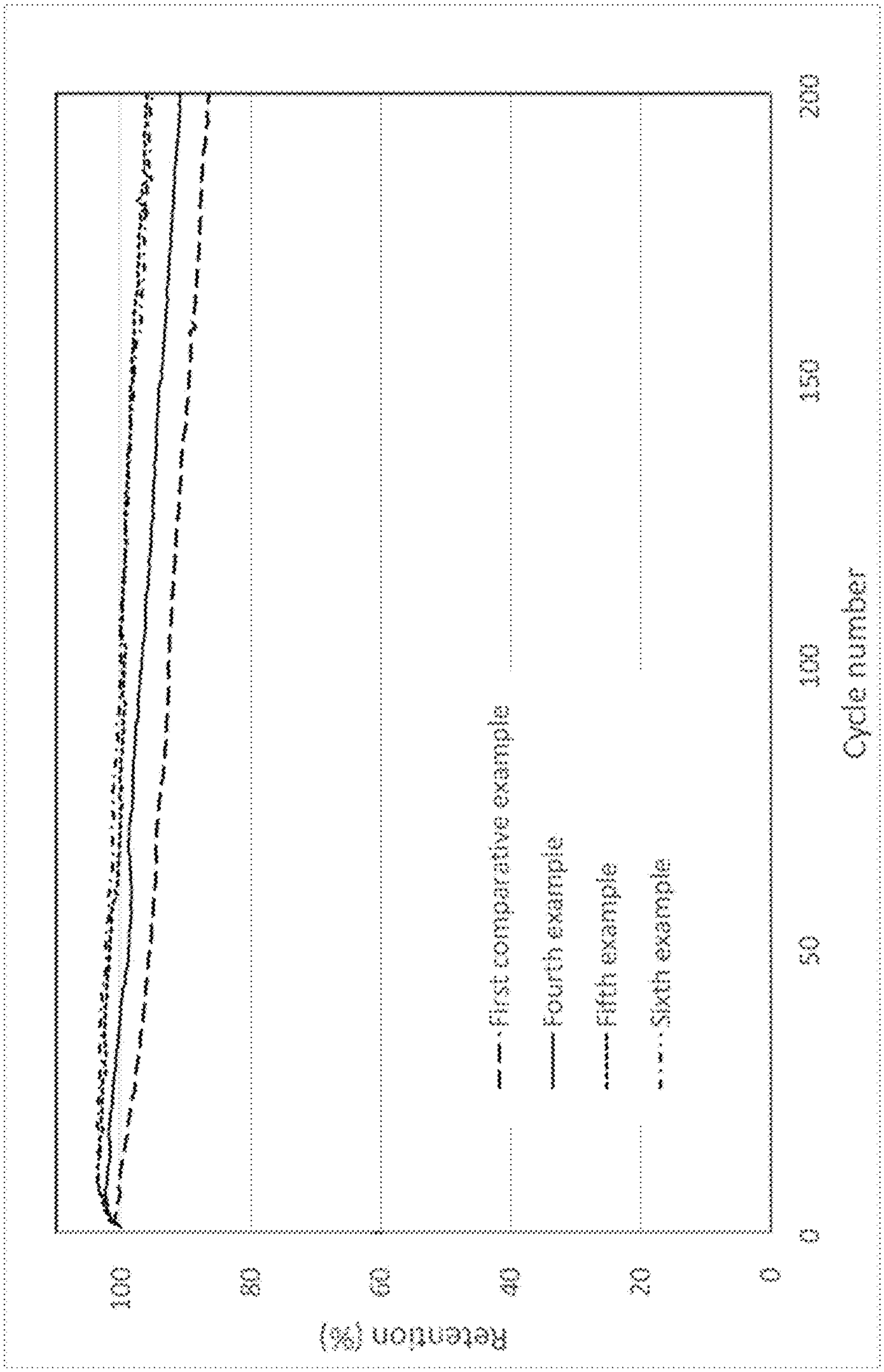
FIG. 15 shows the retention vs. the cycle number curves of the first comparative example, the fourth example, the fifth example and the sixth example of the present disclosure.

FIG. 15 shows the retention vs. the cycle number curves of the first comparative example, the fourth example, the fifth example and the sixth example of the present disclosure. The button batteries made of the first comparative example, the fourth example, the fifth example and the sixth example of the present disclosure are tested at a charge-discharge rate (C-rate) of 1C to obtain the results. As shown in FIG. 15, the capacity retention rates of the fourth example, the fifth example and the sixth example of the present disclosure are all better than those of the first comparative example. It can be seen that the composite positive electrode material formed by the preparation method of the present disclosure has the advantages of improving the cycle performance and the cycle life of lithium nickel manganese oxide (LMNO) cathode material.

From the above, the weight percentage of the LATP solid electrolyte material relative to the nickel-manganese compound material, such as $Ni_{0.25}Mn_{0.75}(OH)_2$ or $Ni_{0.25}Mn_{0.75}O$, is controlled and ranged from 0.2 wt. % to 1.0 wt. % in the present disclosure, so that a better coating effect of the composite cathode material is resulted. Preferably, the weight percentage of the LATP solid electrolyte material relative to the nickel-manganese compound material, such as $Ni_{0.25}Mn_{0.75}(OH)_2$ or $Ni_{0.25}Mn_{0.75}O$, is controlled and ranged from 0.2 wt. % to 0.3 wt. %. That is to say, in the present disclosure, only a small amount of lithium titanium aluminum phosphate (LATP) solid electrolyte is added to form the coating layer to improve the rate performance of the cathode material of lithium nickel manganese oxide (LMNO). The manufacturing cost is further reduced, and an optimized solid-electrolyte coating effect is achieved. On the other hand, it is worth noting that the lithium aluminum titanium phosphate (LATP) is mixed with the pretreatment material of the nickel-manganese compound material in the present disclosure, and then the pretreatment material with the LATP mixed is sintered to form the composite cathode material of lithium nickel manganese oxide (LMNO) with the LATP coated thereon. Preferably, the pretreatment material can be for example the nickel-manganese compound material of $Ni_{0.25}Mn_{0.75}(OH)_2$ or $Ni_{0.25}Mn_{0.75}O$. The cathode material of lithium nickel manganese oxide (LMNO) material is not directly used for coating process.

In a second comparative example, 0.2 wt. % LATP solid electrolyte material is added into the lithium nickel manganese oxide (LMNO) cathode material and add. The average particle size of lithium nickel manganese oxide (LMNO) cathode material is about 15.13 microns, with a surface area of 0.31 $m^2/g$. The is directly coated on the surface of the lithium nickel manganese oxide (LMNO) cathode material in the same mixing manner, so as to obtain the second comparative example.

In a third comparative example, 0.2 wt. % LATP solid electrolyte material is added into the lithium nickel manganese oxide (LMNO) cathode material and add. The average particle size of lithium nickel manganese oxide (LMNO) cathode material is about 15.13 microns, with a surface area of 0.31 $m^2/g$. The LATP solid electrolyte material is directly coated on the surface of the lithium nickel manganese oxide (LMNO) cathode material in the same mixing manner, and a further sintering process is performed, so as to obtain the third comparative example.

Figure 16:
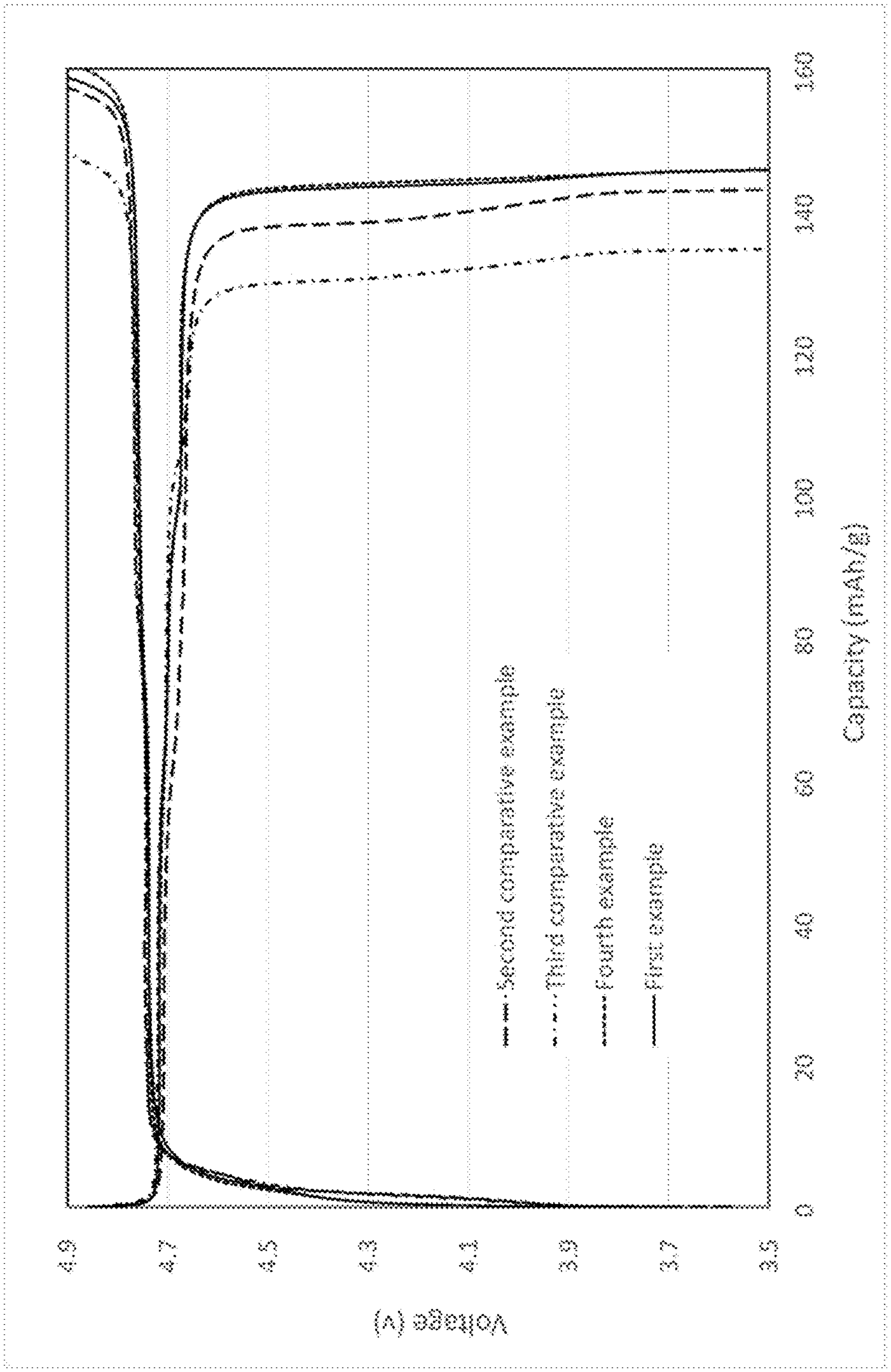
FIG. 16 shows the voltage vs. the charge and discharge capacity curves of the second comparative example, the third comparative example, the first example and the fourth example of the present disclosure.

FIG. 16 shows the voltage vs. the charge and discharge capacity curves of the second comparative example, the third comparative example, the first example and the fourth example of the present disclosure. The button batteries made of the second comparative example, the third comparative example, the first example and the fourth example of the present disclosure are tested at a charge-discharge rate (C-rate) of 0.1C to obtain the results. The 0.1C first-cycle and the second-cycle charge and discharge capacity results are listed in Table 3. In addition, Table 3 also lists the rate performance results of the second comparative example, the third comparative example, the first example and the fourth example of the present disclosure charged at 0.2 and then discharged at 1C/2C/3C/5C. As shown in FIG. 16 and Table 3, the capacities and the rate performance of the first example and the fourth example of the present disclosure are all better than those of the second comparative example and the third comparative example. In the preparation method of the present disclosure, the dry mechanical mixing method is used to mix the nickel-manganese compound material and the LATP solid electrolyte material in advance. Then, the lithium source is added to mix and sinter with the forgoing composite material to form the composite cathode material with a core and a coating layer. It can be seen that the capacity and the rate performance of the composite cathode material prepared through the present disclosure are better than those of the lithium nickel manganese oxide (LMNO) cathode material with the LATP solid electrolyte material directly coated thereon.

| Samples | 0.1 C 1st-cycle charge/discharge capacity (mAh/g) | 0.1 C 2nd-cycle charge/discharge capacity (mAh/g) | 1 C/2 C/3 C/5 C Discharge capacity (mAh/g) | Coulomb efficiency C.E. % |
|---|---|---|---|---|
| First example | 161/146 | 156/146 | 143/135/127/110 | 90.7 |
| Fourth example | 163/146 | 156/146 | 140/129/119/97 | 89.6 |
| Second comparative example | 150/135 | 144/136 | 132/122/112/91 | 90.0 |

-continued

| Samples | 0.1 C 1st-cycle charge/discharge capacity (mAh/g) | 0.1 C 2nd-cycle charge/discharge capacity (mAh/g) | 1 C/2 C/3 C/5 C Discharge capacity (mAh/g) | Coulomb efficiency C.E. % |
|---|---|---|---|---|
| Third comparative example | 159/143 | 150/144 | 139/129/118/94 | 89.9 |

Figure 17:
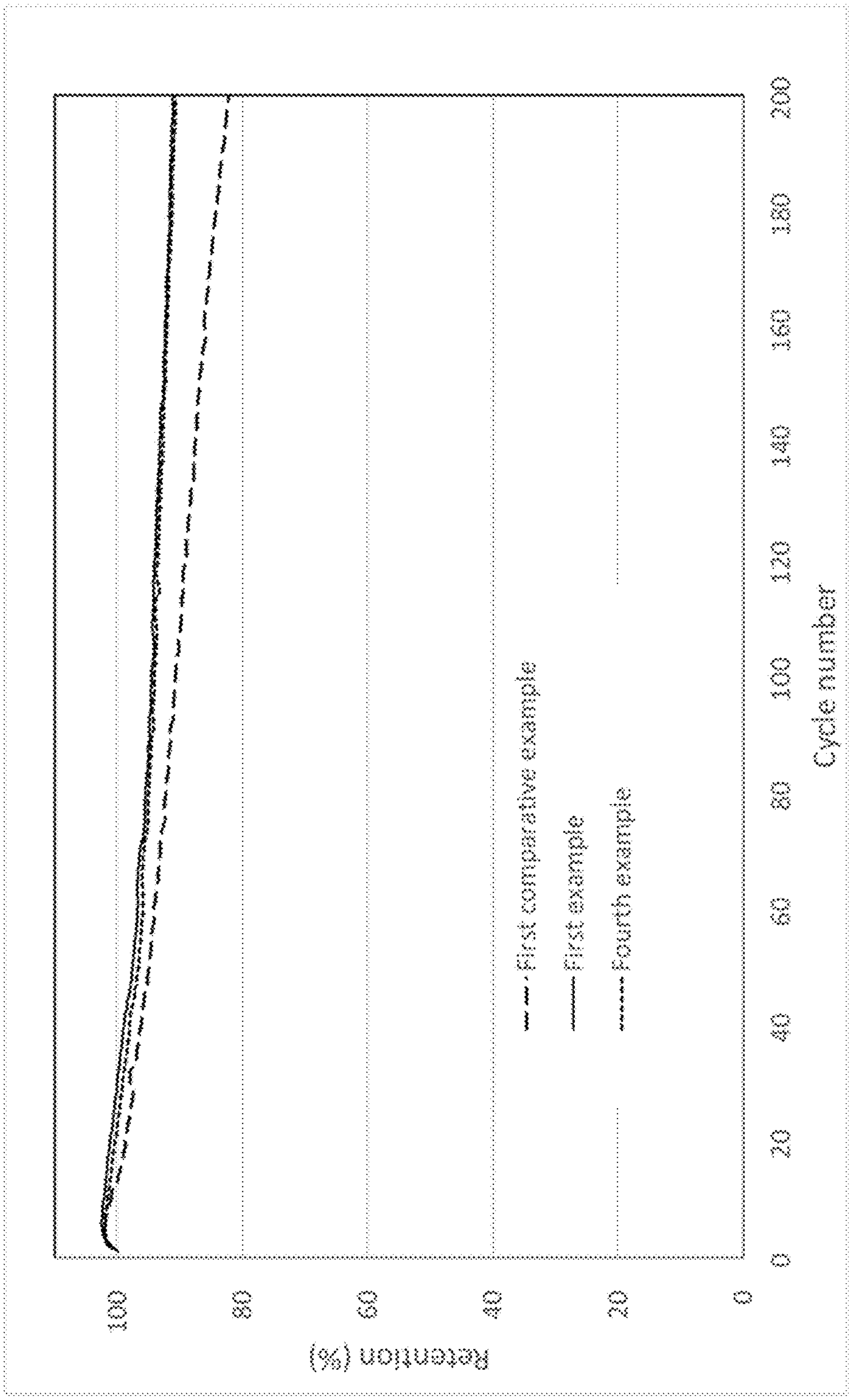
FIG. 17 shows the retention vs. the cycle number curves of the third comparative example, the first example and the fourth example of the present disclosure.

FIG. 17 shows the retention vs. the cycle number curves of the third comparative example, the first example and the fourth example of the present disclosure. The button batteries made of the third comparative example, the first example and the fourth example of the present disclosure are tested at a charge-discharge rate (C-rate) of 1C to obtain the results. As shown in FIG. 17, the capacity retention rates of the first example and the fourth example of the present disclosure are all better than those of the third comparative example. The retention after 200th cycles of the first example and the fourth example of the present disclosure is about 10% higher than that of the third comparative example. Different from the third comparative example, the lithium aluminum titanium phosphate (LATP) is mixed with the pretreatment material of the nickel-manganese compound material firstly through a mechanical mixing way such as a mechanofusion method according to the preparation method of the present disclosure. Then, the pretreatment material with the LATP mixed is sintered to form the composite cathode material of lithium nickel manganese oxide (LMNO) with the LATP coated thereon. In this way, the generation of $Mn^{3+}$ is reduced, and the dissolution of $Mn^{3+}$ from the positive electrode material and the reduction and deposition on the negative electrode are avoided from resulting in cycle electrical decline.

Notably, the preparation method of the present disclosure uses the dry mechanofusion method to mix the nickel-manganese compound material and the solid electrolyte material, and then performs the heat treatment to produce the LMNO cathode material, so that the solid electrolyte material is coated on the surface of the LMNO cathode material simultaneously when the LMNO cathode material is formed. The process is simple and fast. The performance of the composite cathode material obtained is improved sufficiently and better than that of the LMNO cathode material with the solid electrolyte material directly coated thereon. Furthermore, in order to obtain the optimal coating effect of the solid electrolyte material, only a small amount of LATP solid electrolyte material is added to form the coating layer to improve the rate performance of the LMNO cathode material, and the manufacturing cost is further reduced. By controlling the mixing way of the LATP solid electrolyte and the pretreatment material, the working temperature, the rotating speed and the working time, it allows to avoid the structural defects of the solid electrolyte coating layer caused by high temperature and the excessive friction between particles. At the same time, it ensures that the LMNO cathode material can exert low impedance and good charge and discharge performance through the coating layer of LATP solid electrolyte material.

Certainly, the compositions of the nickel-manganese compound material of $Ni_{0.25}Mn_{0.75}(OH)_2$ or $Ni_{0.25}Mn_{0.75}O$, the solid electrolyte material of lithium titanium aluminum phosphate ($Li_{1.3}Al_{0.3}Ti_{1.7}(PO_4)_3$, LATP) and the cathode material of lithium nickel manganese oxide ($LiNi_{0.5}Mn_{1.5}O_4$, LMNO) are adjustable according to the practical requirements. Preferably but not exclusively, the nickel-manganese compound material of $Ni_xMn_y(OH)_2$ or $Ni_xMn_yO$ is mixed with the solid electrolyte material of $Li_{1+z}Al_zTi_{2-z}(PO_4)_3$, x+y=1, and z≤2. Subsequently, the lithium source is added to mix and sinter, and the composite cathode material including the lithium nickel manganese oxide of $LiNi_{2x}Mn_{2y}O_4$ with the lithium titanium aluminum phosphate of $Li_{1+z}Al_zTi_{2-z}$ $(PO_4)_3$ coated on the surface thereof is obtained. It is not redundantly described herein.

In summary, the present disclosure provides a preparation method of a composite cathode material. By using the dry mechanofusion method to mix the precursor and the solid electrolyte material, the solid electrolyte material is coated on the surface of the cathode material simultaneously when the cathode material is formed. The process is simple and fast, and the performance of the cathode material is improved sufficiently. For the application of lithium nickel manganese oxide (LMNO) cathode material coated the solid electrolyte of lithium titanium aluminum phosphate ($Li_{1.3}Al_{0.3}Ti_{1.7}(PO_4)_3$, LATP), the dry mechanical mixing method is used to mix the nickel-manganese compound material, such as $Ni_{0.25}Mn_{0.75}(OH)_2$ or $Ni_{0.25}Mn_{0.75}O$ is mixed with the solid electrolyte material in advance, and then the lithium source is added to mix and sintered to form a composite cathode material with a core and a coating layer. The inner core is made of $LiNi_{0.5}Mn_{1.5}O_4$, and the outer coating layer is made of the solid electrolyte material. Since the solid electrolyte material of lithium aluminum titanium phosphate (LATP) has good ionic conductivity, when the lithium aluminum titanium phosphate (LATP) is coated on the surface of the cathode material of lithium nickel manganese oxide (LMNO) to form a composite cathode material, it facilitates to improve the rate performance and cycle performance of the cathode material of lithium nickel manganese oxide (LMNO), and the coating layer of lithium aluminum titanium phosphate (LATP) can also provide the protection to slow down the impact of the material surface being damaged by the electrolyte solution. Furthermore, in order to obtain the optimal coating effect of the solid electrolyte material, the weight percentage of the solid electrolyte material relative to nickel-manganese compound material, such as $Ni_{0.25}Mn_{0.75}(OH)_2$ or $Ni_{0.25}Mn_{0.75}O$, is controlled and ranged from 0.2 wt. % to 1.0 wt. %, preferably between 0.2 wt. % and 0.3 wt. %. That is to say, in the present disclosure, only a small amount of lithium titanium aluminum phosphate (LATP) solid electrolyte material is added to form the coating layer to improve the rate performance of the cathode material of lithium nickel manganese oxide (LMNO), and the manufacturing cost is further reduced. Compared with direct coating of the cathode material of lithium nickel manganese oxide (LMNO) with the lithium aluminum titanium phosphate (LATP), the lithium aluminum titanium phosphate (LATP) is mixed with the pretreatment material of the nickel-manganese compound material through a mechanical mixing way such as a mechanofusion method in the present disclosure. Then, the pretreatment material with the LATP mixed is sintered to form the composite cathode material of lithium nickel manganese oxide (LMNO) with the LATP coated thereon. In this way, the generation of $Mn^{3+}$ is reduced, and the dissolution of $Mn^{3+}$ from the positive electrode material and the reduction and deposition on the negative electrode are avoided from resulting in cycle electrical decline. The working temperature of the mixing process is ranged for example between 25° C. and 45° C., and the mixing processing is performed in stages at a rotating speed ranged from 700 rpm to 3500 rpm for 5 minutes and 30 minutes. By controlling the mixing way of lithium aluminum titanium phosphate (LATP) and the pretreatment material, the working temperature, the rotating speed and the working time, it allows to avoid the structural defects of the solid electrolyte coating layer caused by high temperature and the excessive friction between particles. At the same time, it ensures that the cathode material of lithium nickel manganese oxide (LMNO) can exert low impedance and good charge and discharge performance through the coating layer of LATP solid electrolyte material.

While the disclosure has been described in terms of what is presently considered to be the most practical and preferred embodiments, it is to be understood that the disclosure needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A preparation method of a composite cathode material, comprising steps of:

(a) providing a nickel-manganese compound material, wherein the nickel-manganese compound material is $Ni_xMn_y(OH)_2$ or $Ni_xMn_yO$, x+y=1;

(b) providing a solid electrolyte material, and mixing the nickel-manganese compound material and the solid electrolyte material in a mechanical mixing into a composite material, wherein the solid electrolyte material has a weight percentage relative to the nickel-manganese compound material, and the weight percentage is ranged from 0.2 wt. % to 1.0 wt. %; and (c) providing a lithium source, mixing the lithium source and the composite material, and sintering to form the composite cathode material, wherein the composite cathode material includes a core and a coating layer, the core is made of $LiNi_{2x}Mn_{2y}O_4$, and coated by the coating layer, and the coating layer is made of the solid electrolyte material.

2. The preparation method of the composite cathode material according to claim 1, wherein the nickel-manganese compound material is $Ni_{0.25}Mn_{0.75}(OH)_2$, the step (b) comprises a first heat treatment process after the mechanical mixing, and the first heat treatment process has a holding temperature ranged from 300° C. to 850° C., a treating time ranged from 5 hours to 7 hours, and a temperature rising rate of 2.5° C./min.

3. The preparation method of the composite cathode material according to claim 1, wherein the nickel-manganese compound material is $Ni_{0.25}Mn_{0.75}O$, the step (a) comprises a pre-oxidation process, and the pre-oxidation process has a holding temperature ranged from 300° C. to 850° C., a treating time ranged from 5 hours to 7 hours, and a temperature rising rate of 2.5° C./min.

4. The preparation method of the composite cathode material according to claim 3, wherein the step (b) comprises a first heat treatment process after the mechanical mixing, and the first heat treatment process has a holding temperature ranged from 300° C. to 750° C., a treating time ranged from 5 hours to 7 hours, and a temperature rising rate of 2.5° C./min.

5. The preparation method of the composite cathode material according to claim 1, wherein the nickel-manganese compound material and the solid electrolyte material are mixed at a rotating speed of 700 rpm for 5 minutes, mixed at a rotating speed of 1400 rpm for 5 minutes, mixed at a rotating speed of 2100 rpm for 5 minutes, mixed at a rotating speed of 2800 rpm for 10 minutes and mixed at a rotating speed of 3500 rpm for 10 minutes in the mechanical mixing of the step (b).

6. The preparation method of the composite cathode material according to claim 1, wherein the nickel-manganese compound material and the solid electrolyte material are mixed at a working temperature ranged from 25° C. to 45° C. in the mechanical mixing of the step (b).

7. The preparation method of the composite cathode material according to claim 1, wherein the solid electrolyte material has a chemical formula of $Li_{1+z}Al_zTi_{2-z}(PO_4)_3$, $Z \leq 2$.

8. The preparation method of the composite cathode material according to claim 1, wherein the mechanical mixing includes a mechanofusion method.

9. The preparation method of the composite cathode material according to claim 1, wherein the lithium source and the composite material are mixed at a rotating speed of 700 rpm for 5 minutes, and mixed at a rotating speed of 1400 rpm for 30 minutes in a mechanical manner of the step (c).

10. The preparation method of the composite cathode material according to claim 1, wherein the step (c) comprises a second heat treatment process, and the second heat treatment process has a holding temperature ranged from 300° C. to 710° C., a treating time ranged from 24 hours to 30 hours, and a temperature rising rate of 2.5° C./min.

11. The preparation method of the composite cathode material according to claim 1, wherein the nickel-manganese compound material has a molar ratio of 1:1.02 relative to the lithium source in the composite material in the step (c).

12. The preparation method of the composite cathode material according to claim 1, wherein the weight percentage of the solid electrolyte material relative to the nickel-manganese compound material is ranged from 0.2 wt. % to 0.3 wt. %.

13. The preparation method of the composite cathode material according to claim 1, wherein the nickel-manganese compound material has an average particle size ranged from 10 microns to 20 microns, and the solid electrolyte material has an average particle size ranged from 1 micron to 5 microns.

* * * * *